T. Lindsay.
Rag Engine.
N° 47,739.   Patented May 16, 1865.

Witnesses:

Inventor:
Thomas Lindsay
per Munn & Co
attorneys

UNITED STATES PATENT OFFICE.

THOMAS LINDSAY, OF MONTVILLE, CONNECTICUT.

IMPROVEMENT IN RAG-ENGINES OF PAPER-MAKING MACHINERY.

Specification forming part of Letters Patent No. 47,739, dated May 16, 1865.

*To all whom it may concern:*

Be it known that I, THOMAS LINDSAY, of Montville, in the county of New London and State of Connecticut, have invented a new and useful Improvement in Paper-Making Machinery; and I do hereby declare that the following is a full, clear, and exact description thereof, which will enable others skilled in the art to fully understand and use the same, reference being had to the accompanying drawings, forming part of this specification, in which—

Figure 1:
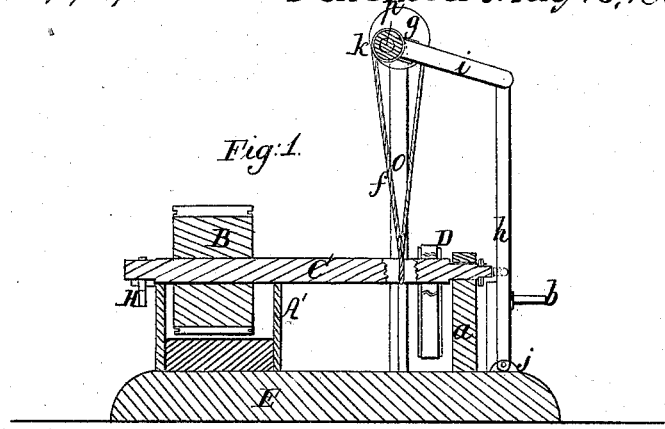
Figure 2:
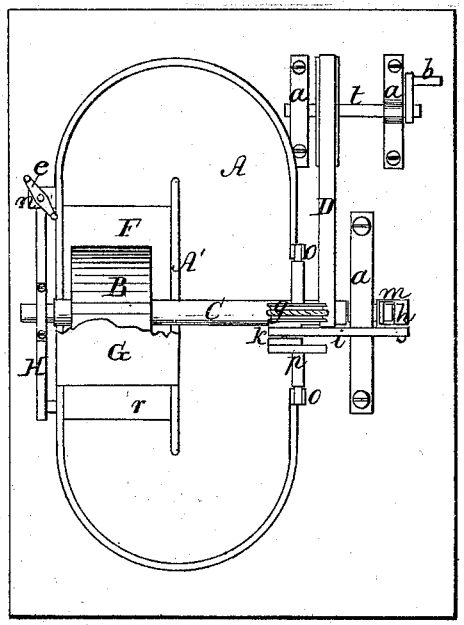

Figure 1 is an elevation of a vertical cross-section of the apparatus which contains my improvements. Fig. 2 is a plan thereof.

Similar letters of reference indicate like parts.

This invention consists in giving to the beater-wheel of the apparatus for making paper-pulp a reciprocating motion during its rotation in the tank.

A is the ordinary tank, with rounded ends, in which the paper-stock is reduced to the condition of pulp by the action of the beater-wheel B, the latter being armed with blades, as usual. The tank is sustained upon a platform or floor, E, which also sustains three standards, *a*, two of which furnish bearings for the driving-shaft *t*, the other carrying the outer end of the working shaft C. The tank has the usual partial partition, A', set in the middle of its width and extending at right angles from the shaft C on each side thereof about half-way to either end of the tank.

F is the usual bed-plate, fixed in the bottom of the tank between the partition, A', and the left-hand side of the tank, and above which the beater B is set, the length of the said beater being less than the width of that division of the tank in which it rotates, so that it is free to move endwise therein. The shaft C, which carries the beater, is carried at its right hand end upon the standard *a*, and at its left-hand end upon the adjustable bearing H, which is raised and lowered, according to the exigencies of the work, by means of a screw-rod, *e*, working in a bracket, *n*, fastened to the outside of the tank. The shaft C is free to slide endwise in its bearings. It is driven by a belt, D, from a shaft, *t*, which is rotated by a crank, *b*, or other suitable device.

O O are standards, which carry at their upper ends the journals of an upper shaft, *p*, that is made to rotate by means of a belt, *f*, running from the shaft C over a pulley, *g*, fixed on said upper shaft.

*k* is a disk set eccentrically upon the shaft *p* and connected by a strap or by other suitable devices to a connecting-rod, *i*, jointed to the upper end of an upright vibrating lever, *h*, whose foot is jointed to ears *j* or to a bracket rising from the platform E. The lever *h* passes outside of and near the adjacent end of the shaft C, to which it is connected by a metallic strap, *m*, or other suitable device, which shall cause them to move in unison. The beater is covered by a hood, G, as usual.

The operation of the apparatus is substantially as follows: Motion being given to the shaft C, the beater-wheel is caused to rotate in the division of the tank in which it is set, thereby creating an active current of the contents of the tank through that division. As the stock passes beneath the beater, it is disintegrated and ground fine into the desired condition of pulp by the conjoint action of the blades of the beater and the corrugated surface of the bed-plate F, over whose hinder edge it is carried by the beater. Meanwhile the shaft *p* is rotated by means of the band *f*, and the lever *h* is vibrated upon its foot *j*, causing the shaft C to have a longitudinal motion, and thereby giving a reciprocating movement to the beater B. The extent of this reciprocation is determined by the degree of eccentricity given to the eccentric K, and its rapidity is determined by the relative sizes of the pulleys used on the shafts C and *p*. The effect of this movement of the beater-wheel is to subject the paper-stock to an additional cutting action between the blades of the beater and the cutting-surface of the bed F, and the blades or knives are thereby cleared of any stock that may adhere to and clog them. The same result is accomplished by giving a reciprocating movement to the bed-plate instead of having it stationary, as I have shown it in this example of my invention.

I claim as new and desire to secure by Letters Patent—

Giving an endwise reciprocating motion to the beater of a pulping-engine in addition to its usual motion, substantially as above described.

THOMAS LINDSAY.

Witnesses:
PATRICK O'CONNELL,
ELIAS BROWNING.